(12) United States Patent
Mizuno et al.

(10) Patent No.: US 6,435,298 B1
(45) Date of Patent: Aug. 20, 2002

(54) VEHICLE REAR UNDERSIDE STRUCTURE

(75) Inventors: Kazutoshi Mizuno; Ryoji Maeda; Akihito Yamazaki; Chiaki Takayama, all of Kanagawa-ken (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 09/466,482

(22) Filed: Dec. 17, 1999

(30) Foreign Application Priority Data

Dec. 22, 1998 (JP) .......................... 10-363906
Dec. 22, 1998 (JP) .......................... 10-365322

(51) Int. Cl.[7] .................... B60K 17/00; B60R 9/18; B60J 1/00
(52) U.S. Cl. ................ 180/346; 280/762; 296/180.1
(58) Field of Search ................. 180/346, 69.1, 180/903; 280/762; 296/180.1

(56) References Cited

U.S. PATENT DOCUMENTS

| | | | | |
|---|---|---|---|---|
| 3,754,615 A | * | 8/1973 | McIndoo et al. | 180/69.1 |
| 4,569,551 A | * | 2/1986 | Rauser et al. | 296/204 |
| 4,640,541 A | * | 2/1987 | FitzGerald et al. | 296/180.1 |
| 4,655,307 A | * | 4/1987 | Lamoureux | 180/69.1 |
| 4,772,060 A | * | 9/1988 | Kretschmer | 296/180.1 |
| 4,966,408 A | * | 10/1990 | Yura | 180/903 |
| 5,025,878 A | | 6/1991 | Preiss | |
| 5,042,870 A | * | 8/1991 | Yura | 296/180.1 |
| 5,813,491 A | | 9/1998 | Sato et al. | |
| 6,116,365 A | * | 9/2000 | Preiss et al. | 180/903 |

FOREIGN PATENT DOCUMENTS

| | | | | |
|---|---|---|---|---|
| DE | 3712048 A1 | * | 10/1988 | B62D/35/02 |
| DE | 41 02 073 A1 | | 7/1992 | |
| DE | 43 19 281 A1 | | 12/1994 | |
| DE | 195 43 778 A1 | | 5/1997 | |
| DE | 197 11 336 A1 | | 9/1998 | |
| JP | 2303980 | * | 12/1990 | B62D/35/02 |
| JP | 4-339079 | | 11/1992 | |
| JP | 4358972 | * | 12/1992 | B62D/25/20 |

* cited by examiner

Primary Examiner—Paul N. Dickson
Assistant Examiner—Joselynn Sliteris
(74) Attorney, Agent, or Firm—McDermott, Will & Emery

(57) ABSTRACT

A rear underside structure of a vehicle as a rear undercover main body, an air flow path, an air intake opening, and an air exhaust opening. The rear undercover main body has an inclined planar part that rises toward the rear of the vehicle, and is disposed further to the rear of than the fuel tank, between the front and rear axles, so as to cover a drive element of the vehicle. The air flow path is disposed between the rear undercover main body and the drive element. The inclined planar part delineates at least a rear part of the air flow path. The air intake opening is disposed further to the front than the drive element, and the air exhaust opening is disposed to the rear of the inclined planar part. Air which flows in from the air intake opening passes through the air flow path, and is exhausted from the exhaust opening.

3 Claims, 17 Drawing Sheets

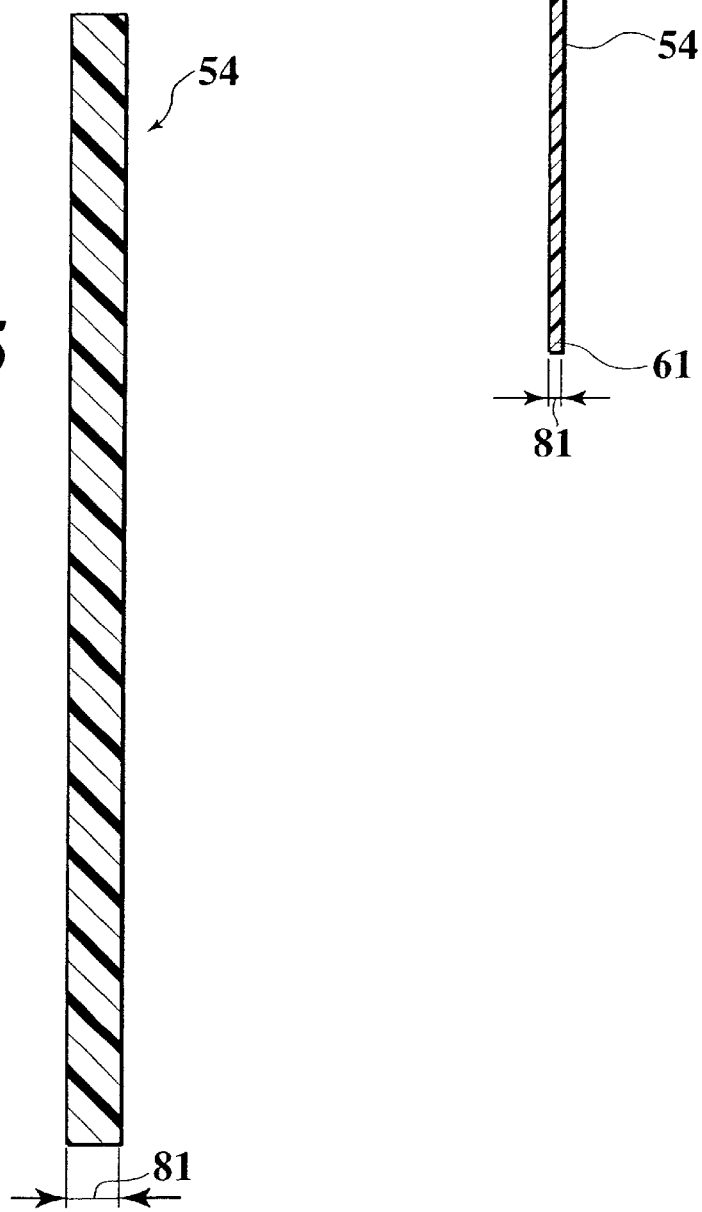

VEHICLE REAR UNDERSIDE STRUCTURE

The contents of Applications No. TOKUGANHEI 10-363906 and TKUGANHEI 10-365322, each of which is filed on Dec. 22, 1998 in Japan, is hereby incorporated by reference.

BACKGROUND OF THE INVENTION

1. Field of the Invention

The present invention relates to the structure on the rear underside of a vehicle.

2. Description of the Related Art

Structures related to that of the present invention have a rear floor panel, and rear bumper or the like having a protrusion for a fuel tank between the front and rear axles, a fuel tank, a differential gear to the rear of the fuel tank, and a well for housing a spare tire.

SUMMARY OF THE INVENTION

In related structures as noted above, however, part of the air which passes from the front of the vehicle, guided along the bottom side thereof is caught up and dwells in the space above the differential, because of the well part.

Additionally, because the bottom edge of the rear bumper extends downward, part of the air is pulled upward so as to dwell in the space at the front of the bumper.

At the rear of the vehicle, part of the air exiting from the bottom rear side is pulled upward and disturbed, thereby causing an increase in resistance.

For this reason, the air which has cooled the fuel tank and the differential gear is hindered from passing smoothly toward the rear of the vehicle.

Accordingly, it is an object of the present invention to provide an underside structure for a vehicle, which not only provides cooling for drive elements, but also reduces the disturbance of air at the rear of the vehicle.

The structure of the present invention has a rear undercover main body, a flow path, an air intake opening, and an air exhaust opening. The rear undercover main body has an inclined planar part that is inclined upward toward the rear of the vehicle, this inclined planar part being disposed beneath a drive element that is further to the rear than the fuel tank between the front and rear axles of the vehicle, so as to cover the rear under part of the vehicle, including the drive element thereof. The air flow path is disposed between the rear undercover main body and the drive element. The inclined planar part minimally delineates a rear part of the air flow path. The air intake opening is disposed further to the front than the drive element, and the air exhaust opening is disposed further to the rear than the inclined planar part. Air flowing in from the air intake opening passes through the air flow path, and flows out from the exhaust opening.

In the above-noted structure, part of the air from the air intake opening further forward than the drive elements is divided off and guided into the air flow path.

Air that passes beneath the rear undercover main body is formed into a negative-pressure region by the action of the inclined planar part.

For this reason, the part of the air passes through the air flow path and is smoothly exhausted from the air exhaust opening.

Therefore, cooling of the drive elements that face the air flow path is performed smoothly, and there is a reduction in the disturbance of air at the rear of the vehicle.

BRIEF DESCRIPTION OF THE DRAWINGS

FIG. 14 is a cross-section view from a position indicated by the line XIV—XIV in FIG. 13.

FIG. 15 is a cross-section view from a position indicated by the line XV—XV in FIG. 13.

DESCRIPTION OF THE PREFERRED EMBODIMENTS

Figure 1:
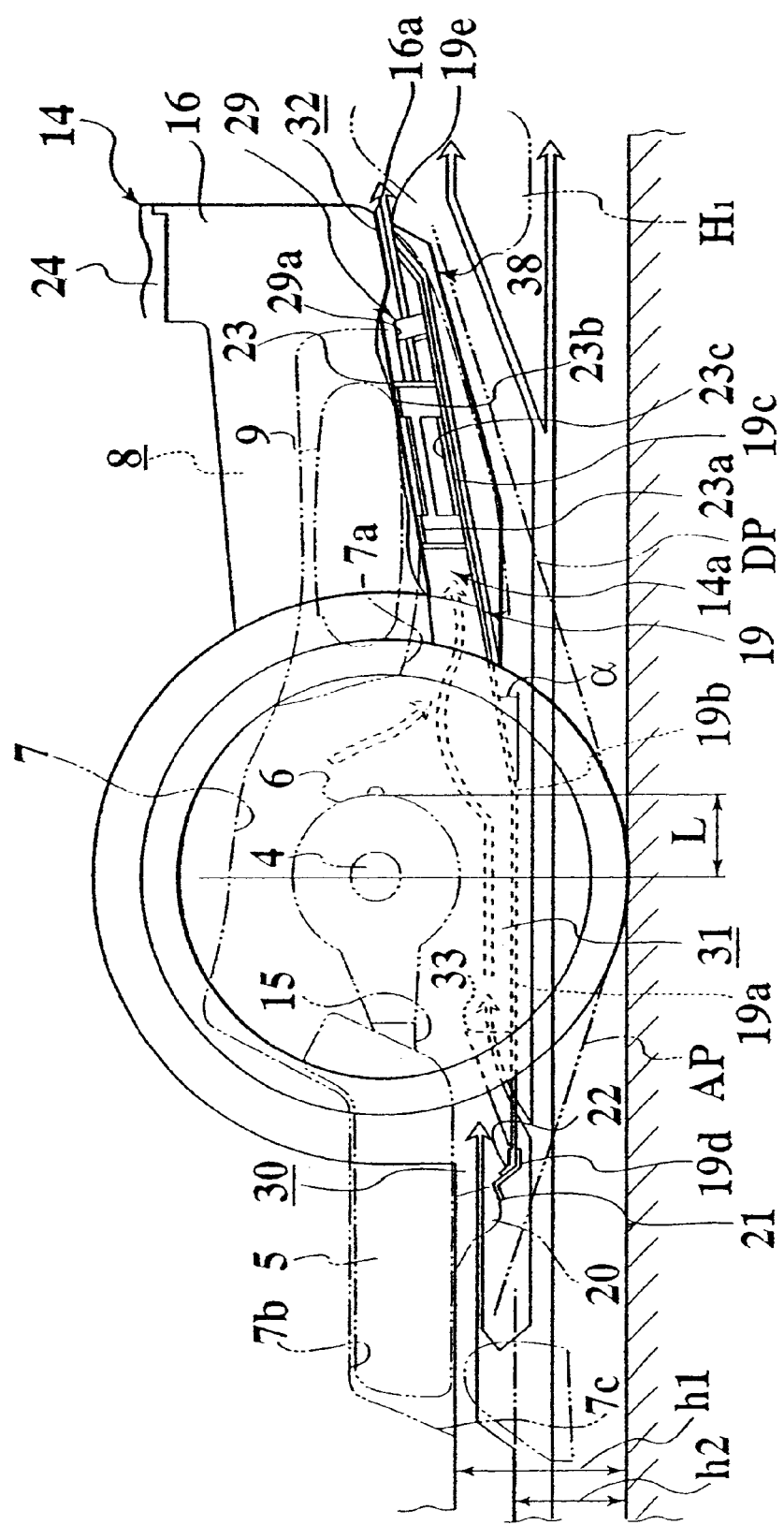
FIG. 1 is a partial cross-section view, seen from the side, of the rear part of a vehicle having the rear undercover structure of the first embodiment of the present invention.
Figure 2A:
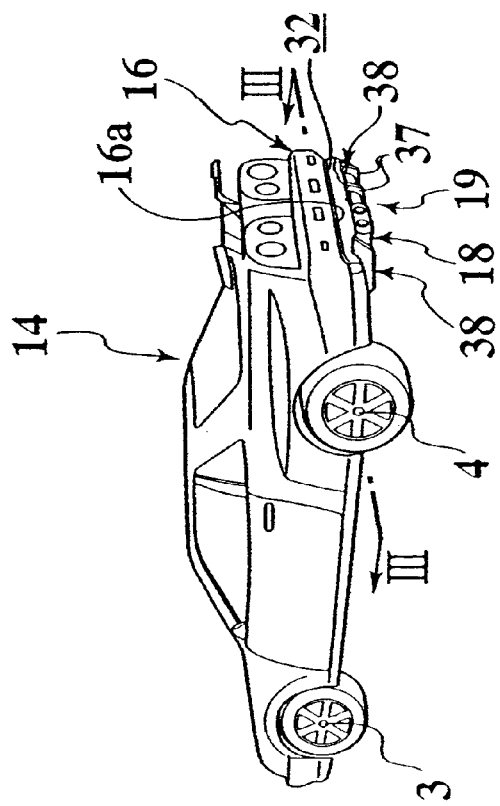
FIG. 2A is a perspective view, seen from the rear, of the rear undercover structure of FIG. 1.
Figure 2B:
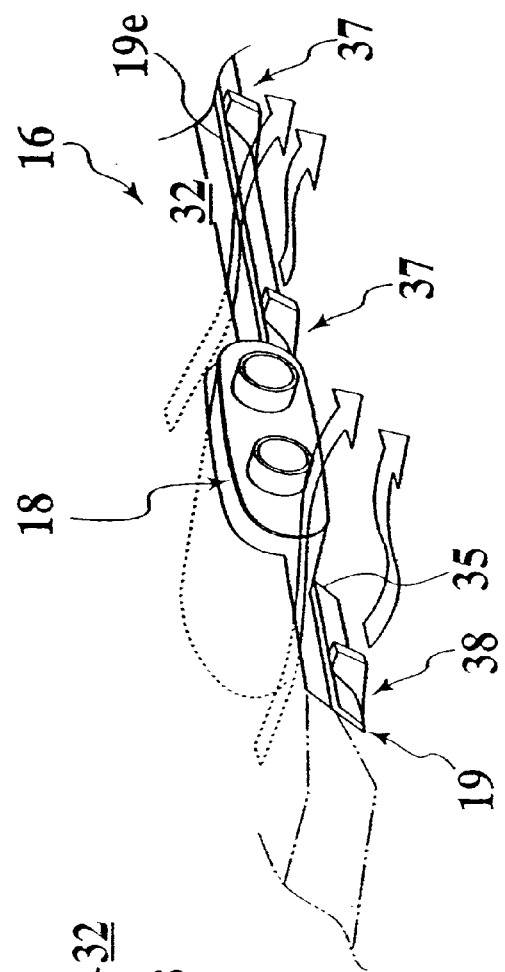
FIG. 2B is a partial enlargement of FIG. 2A.

Preferred embodiments of the present invention are described below in detail, with references being made to relevant accompanying drawings. Unless otherwise noted, the front and rear directions refer to the front and rear of the vehicle, and the width direction refers to the width direction of the vehicle.

FIG. 1 to FIG. 7 show a first embodiment of the present invention.

In the structure of the first embodiment, a saddle-shaped fuel tank 5, through which a center shaft 15 passes is disposed at substantially the bottom center of the vehicle, between the front and rear axles 3 and 4. Further to the rear than the fuel tank 5, there is disposed a differential-gear 6, which serves as a drive element. The fuel tank 5 is disposed beneath a rear floor panel 7, which is linked to the center shaft 15 and which forms part of the body of the vehicle. The rear under part 14a of the vehicle 14 is formed by the fuel tank 5, the differential gear 6, the rear floor panel 7, and the rear bumper 16, to be described below.

The rear floor panel 7 has a downward protruding housing well 7a for a spare tire 9 held in a trunk space A.

The rear floor panel 7 also has formed on it a kick-up part 7b for housing the fuel tank 5.

A rear bumper 16 is attached to the rear end part of the vehicle 14. Part of the lower edge 16a of the rear part of the rear bumper 16 has a downward opening depression that enables the protrusion of part of a muffler 18 which extends to the front and to the rear.

Beneath the differential gear 6 is provided a rear undercover main body 19 so as to cover the rear under part 14a of the vehicle 14.

Figure 5:
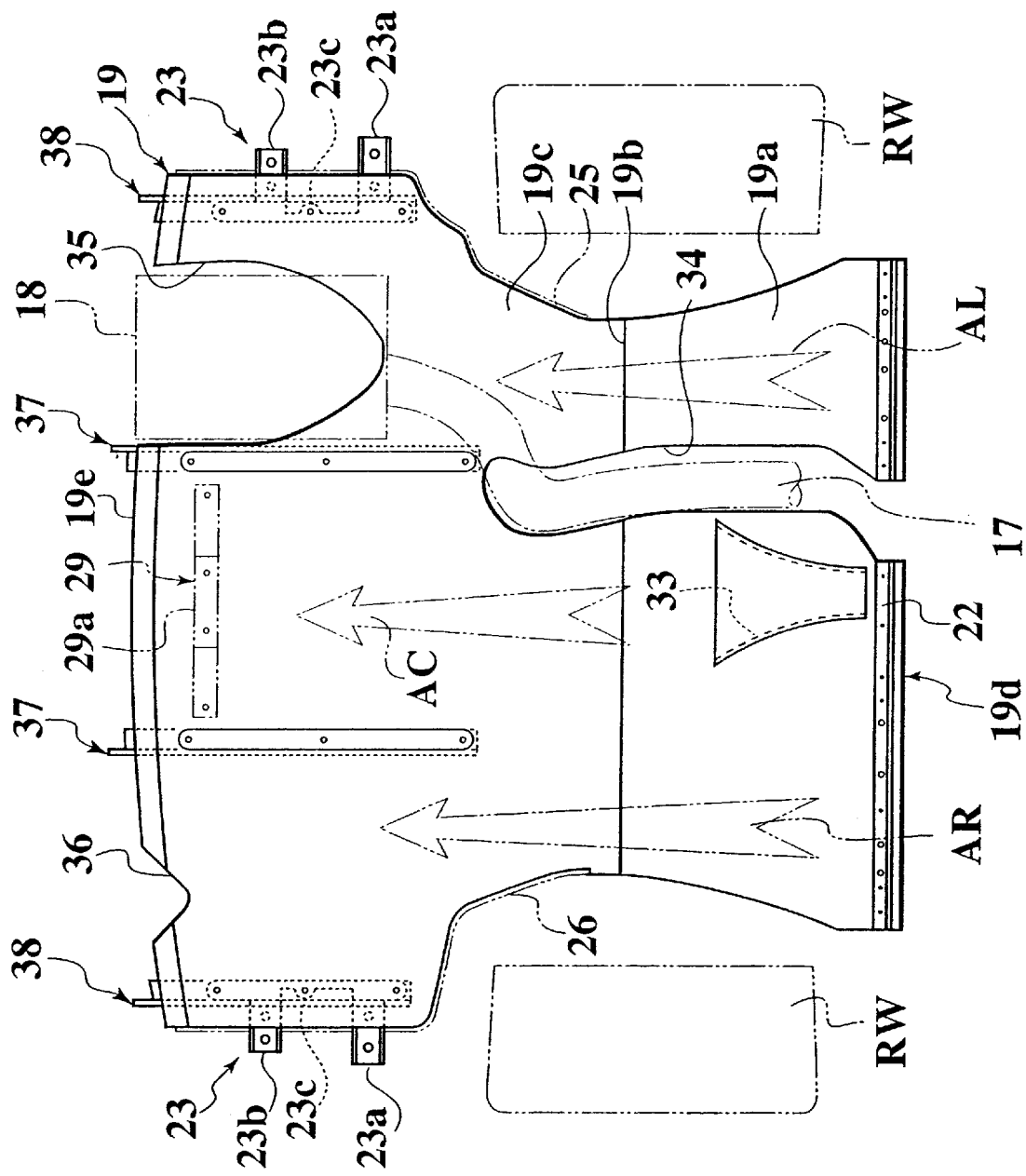
FIG. 5 is a top view of the rear undercover main body of FIG. 1.
Figure 6:
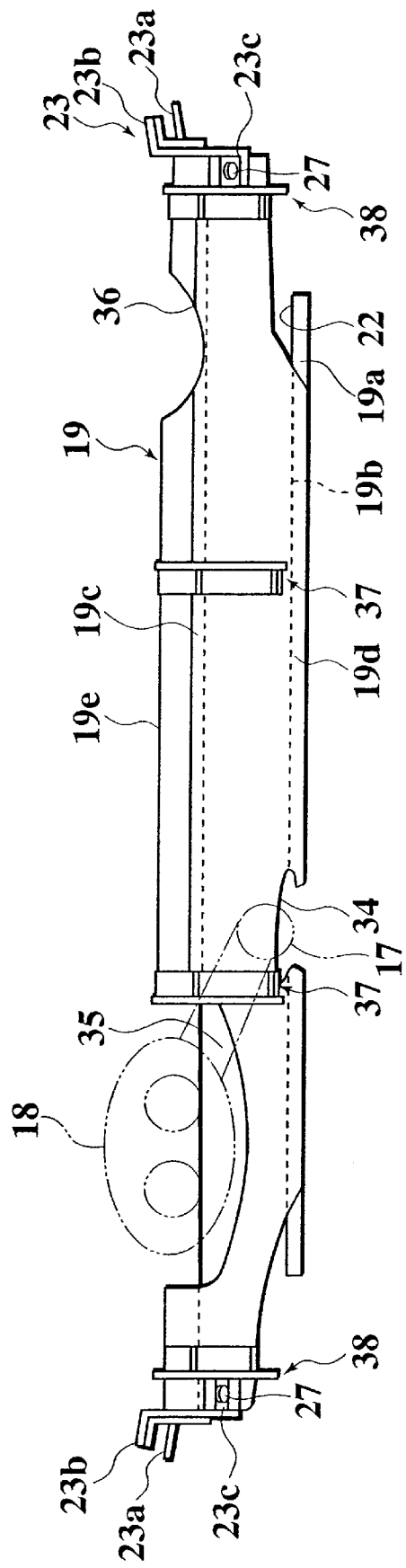
FIG. 6 is a rear view of the rear undercover main body of FIG. 1.
Figure 7:
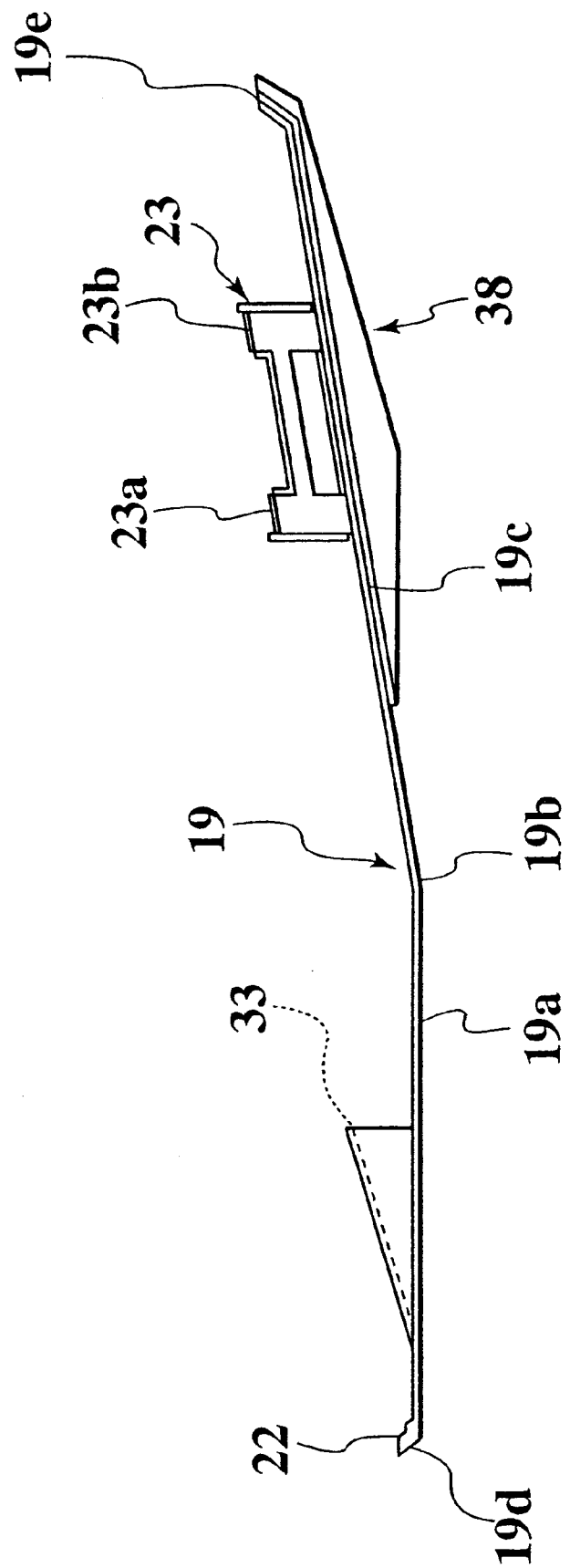
FIG. 7 is a side view of the rear undercover main body of FIG. 1.

The rear undercover main body 19 is made from a carbon resin sheet, the horizontal cross-section of which is substantially formed into a honeycomb shape so as to impart to it high rigidity. As shown in FIG. 5 through FIG. 7, the rear undercover main body 19 is formed by a horizontal planar part 19a that is fixed in a substantially horizontal attitude with respect to the road surface, followed by a bend part 19b, and then an inclined planar part 19c, which extends and is raised to the rear at a prescribed angle of a (being, in this embodiment, approximately 90° to 100°).

Figure 4:
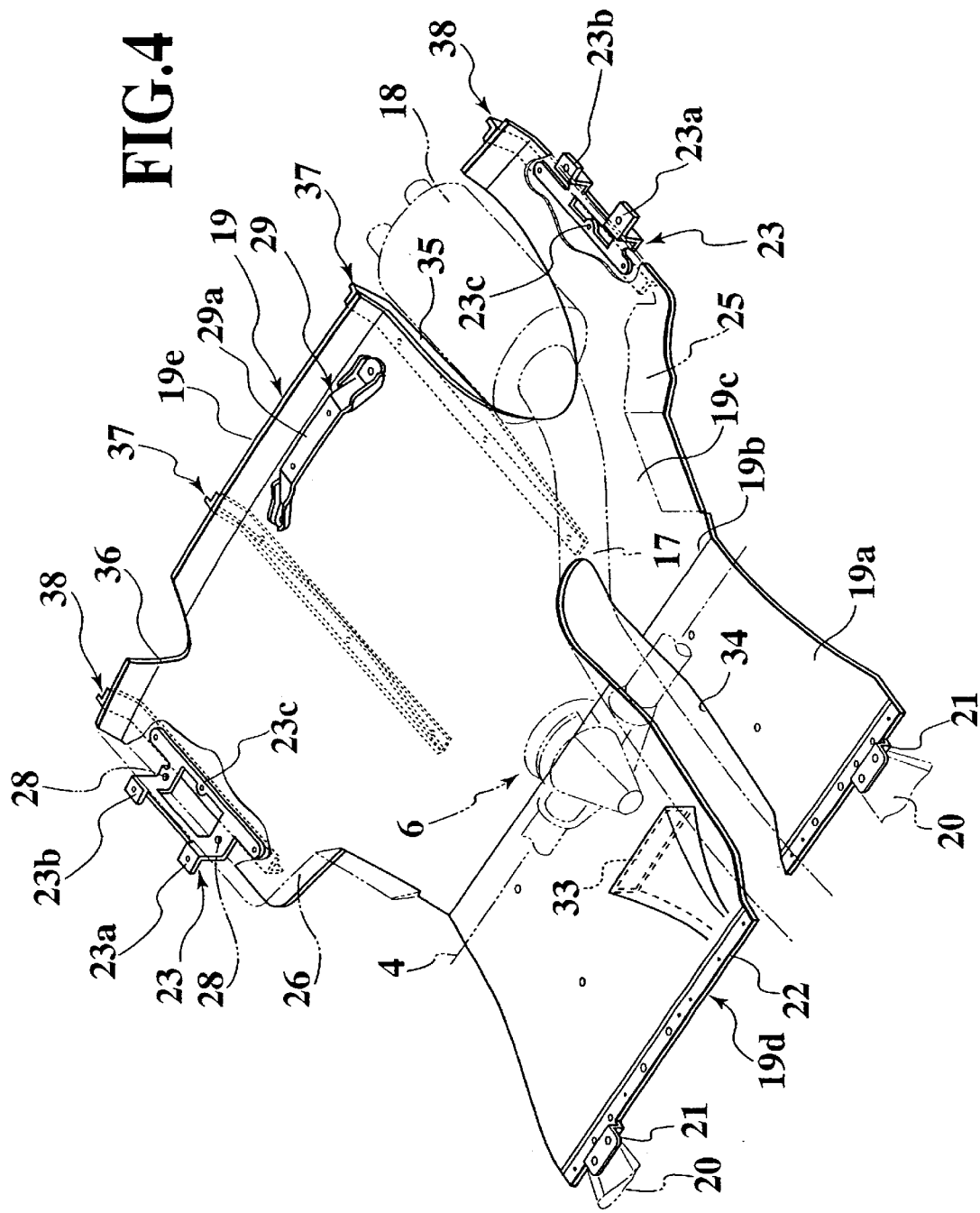
FIG. 4 is a perspective view of the rear undercover main body of FIG. 1.

On the front edge 19d of the rear undercover main body 19, as shown in FIG. 4, there is disposed a reinforcing member 22 that extends in the width direction. A pair of left and right front brackets 21 mounted to the rear suspension mounting brackets 20 on the vehicle side are fixed to the reinforcing member 22.

The front edge 19d, as shown in FIG. 1, is provided further to the rear than the front edge 7c of the kick-up part 7b of the rear floor panel 7.

The front edge 19d is disposed so as to be not only lower than the lowest height of the rear floor panel 7 of the vehicle 14 but also higher than the approach angle line AP of the rear wheel RW.

On each the left and right side, a side edge bracket 23 is provided on the side edge of the inclined planar part 19c of the rear undercover main body 19.

Figure 3:
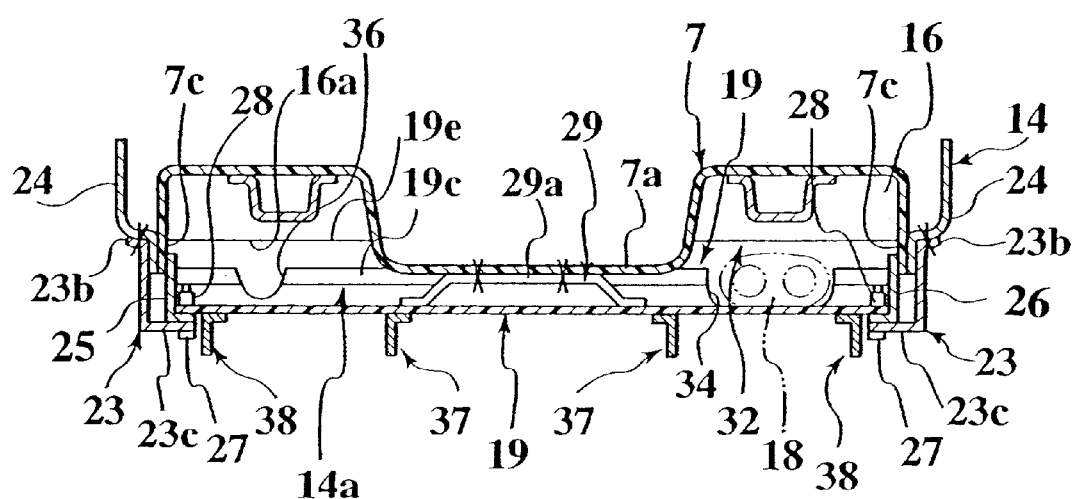
FIG. 3 is cross-section view from the position indicated by the line III—III in FIG. 2A.

Each of the side edge brackets 23 has a Z-shaped cross-section. As shown in FIG. 3, the upper sides 23a and 23b of the brackets 23 are welded to positions neat the lower edges of rear fender panels 24, which are joined to the side edges 7c of the rear floor panel 7.

The lower side parts 23c of the side edge brackets 23, along with the left and right mud guard vertical walls 25 and 26, which extend upward from the two side edges of the inclined planar part 19c, are held in place on the rear undercover main body 19 by bolt members 27 and nut members 28.

A rear bracket 29, having a substantially heart-shaped cross-section, is fixed to near the rear edge 19e of the inclined planar part 19c.

An upper side part 29a substantially in the center of the width direction of the rear bracket 29 is welded-to the rear tire housing well 7a, so that the rear undercover main body 19 is physically separated from the rear floor panel 7 on the bottom part of the vehicle. As shown in FIG. 1, the front edge 19d of the rear undercover main body 19 is positioned further to the front than the differential gear 6, and forms a space 30 that serves as the air intake opening.

In between the differential gear 6 and the rear undercover main body 19, there is delineated an air flow path 31. The lower part of the air flow path 31 is delineated by the horizontal part 19a and the inclined planar part 19c.

The rear edge 19e of the inclined planar part 19c is separated from the lower edge part 16a of the rear bumper 16, thereby delineating a space 32 that serves as the air exhaust opening.

The bend part 19b that makes up the front edge of the inclined planar part 19c is disposed at a prescribed distance of L further to the rear from the rear axle 4, which is the rotational center of the differential gear 6.

At substantially the center in the width direction of the horizontal planar part 19a of the rear undercover main body 19, an opening 33 for intake air is formed. The opening 33 guides air which comes into contact with the differential gear 6.

An exhaust pipe cutout 34, which extends from the front edge 19d of the rear undercover main body to the center part of the inclined planar part 19c is formed at the position of an exhaust pipe 17 on the rear undercover main body 19.

In the region of the rear edge 19e of the inclined planar part 19c, a cutout 35 is formed to allow the muffler 18 to protrude. On the rear edge 19e of the rear undercover main body 19, a cutout 36 is formed to enable-a towing bracket-to protrude.

In the first embodiment, a plurality of flow-adjusting fins 37 and 38, which extend forward and rearward, are fixed to the lower part of the rear undercover main body 19.

The lower edges of the fins 37 and 38 are positioned so as to be higher than and aligned along the departure angle line DP of the rear wheel RW. Of the fins, the fins 38 on both sides are disposed substantially along a direction extending toward the rear of the inside surface of the center of the vehicle at the rear wheels. One of the center fins 37 is disposed substantially along a direction extending toward the rear of the exhaust pipe cutout 34.

The action of the first embodiment of the present invention is described below.

Part of the air that is introduced to beneath the vehicle passes from the space that is formed between the front edge 19d of the rear undercover main body 19 and the rear floor panel that form the underside of the vehicle at a position that is further forward than the differential and is guided into the air flow path 31 formed between the upper part of the rear undercover main body 19 and the rear floor panel 7.

Part of the air that passes below the rear undercover main body 19 forms a negative-pressure region beneath the bend part 19b because of the inclined planar part 19c of the rear undercover main body 19. In particular, a strong negative pressure H1 develops near the rear edge 19e of the rear undercover main body 19.

For this reason, the divided air that is introduced via the space 30 passes through the space formed between the differential gear 6 and the rear undercover main body 19, and is smoothly exhausted from the space 32. When this occurs, air-temperature air in the area surrounding the differential gear 6 is caught up and simultaneously exhausted.

Therefore, not only is smooth cooling of the differential gear 6 is performed, but also the flow of air that has passed under the rear undercover main body 19 is adjusted by means of the exhausted air, thereby reducing the disturbance of air occurring at the rear of the vehicle 14.

Because the front edge 19d is disposed further to the rear than the edge 7c of the kick-up part 7b of the rear floor panel 7, air that is introduced to the underpart of the vehicle 14 is guided upward along the rear floor panel 7 by the front edge 19d.

For this reason, the introduction of air from the space 30 is further enhanced.

Because the fuel tank 5 is disposed in a well at the underpart of the vehicle at a position that is formed by the kick-up part 7b, air that is introduced along the rear floor panel 7 acts to cool the area surrounding the fuel tank 5.

The exhaust pipe 17 and the muffler 18 are disposed within the air flow path 31 at the upper part of the rear undercover main body 19. For this reason, the air in the area surrounding the exhaust pipe 17 and the muffler 18 is smoothly pulled into the negative-pressure Hi direction through the air exhausting space 32.

Therefore, the area surrounding the differential gear 6 and the heated air to the front of the rear floor panel 7 is not pulled upward and held, but rather acts to smoothly cool the differential gear 6 and other drive elements. Simultaneously, because there is a reduction in the disturbance of air flow occurring at the rear of the vehicle, there is a balanced achievement of a desirable down force, which is imparted to the rear axle 4, and as reduction in the resistance value.

Because the front edge 19d is disposed at a height h2 that is lower than the lowest height h1 of the rear floor panel 7 above the road surface, the flow of air that is introduced to beneath the vehicle along the rear floor panel 7 is smoothly divided between the upper and lower parts of the rear undercover main body 19.

Because the bend part 19b that forms the front edge of the inclined planar part 19c is disposed further to the rear by a prescribed distance of L than the differential gear 6, in the air flow path 31 beneath the differential gear 6, it is possible to lengthen the path of air passing substantially horizontally along the horizontal planar part 19a. For this reason, the exhausting efficiency is improved, and the flow of air is further improved.

By positioning the bend part 19b further to the rear by the prescribed distance L than the differential gear 6, the angle a of rear rise of the inclined planar part 19c can be set to an angle of approximately 9° to 10°, which optimizes the balance between the air flow resistance at the rear under part 14a of the vehicle 14 and the down force imparted as a result of the negative pressure. Furthermore, the angle of inclination $\alpha$ is also the angle which provides a pleasant appearance when viewed from a distance behind the vehicle. Thus, by providing a horizontal planar part 19a and positioning the bend part 19b at a distance of L to the rear, it is possible to achieve an optimum angle of the inclined planar part 19c, regardless of the overhang length at the rear of the vehicle 14.

Upwardly extending left and right mud guard vertical walls 25 and 26 are provided on both side edge parts of the rear undercover main body 19. For this reason, there is no reason for the mud guard members to protrude downward from the rear edge of the rear tire well. Therefore, the under part of the vehicle 14 is made flat, so that there is a further reduction in the disturbance of air flow at the rear of the vehicle.

Air that is introduced from the opening 33 is guide beneath the differential gear 6, and is introduced from the space 30, passing through the air flow path 31, after which it is exhausted toward the rear of the vehicle.

For this reason, the flow of cooling air passing beneath the differential gear 6 is increased, thereby further improving the efficiency of cooling.

Because of the exhaust pipe cutout 34, the rear wheels RW, and cutout for the rear wheels RW in the rear undercover main body 19, the flow of air beneath the rear undercover main body 19 tends to become disturbed. However, because a plurality of flow-adjusting fins 37 and 38 are disposed in the front-to-back direction on the bottom of the rear undercover main body 19, the flow of air is divided under the inclined planar part 19c between the right air flow AR, the center air flow AC, and the left air flow AL. Simultaneous with this air flow adjusting action, air that enters from the side of the vehicle into the region of negative pressure H1 is reduced. By doing this, there is a further reduction in the disturbance of air occurring at the rear of the vehicle.

Therefore, the divided air flows AR, AC, and AL tend not to enter an adjacent flow region at the region in which the fins 37 and 38 are positioned. For this reason, in the negative pressure region occurring at the inclined planar part 19c, it is possible to effectively use the divided air flows. thereby making it possible to achieve a desired down force.

Because the fuel tank 5, the differential gear 6, the muffler 18 and other elements provided at the underpart of the vehicle are covered by the rear undercover main body 19, it is also possible to prevent damage to these elements.

The above describes the first embodiment of the present invention with reference to relevant accompanying drawings. It will be understood, however, that the actual configuration of the present invention is not limited to that described, and is amenable to various changes, within the scope and spirit of the present invention.

For example, while in the first embodiment the front edge 19d is disposed further to the rear than the front edge 7c of the kick-up part 7b of the rear floor panel 7, the position is not restricted in this manner, and it is also possible to have the front edge 19d disposed at substantially the same position as or further toward the front than the front edge 7c of the kick-up part 7b.

Additionally, although the first embodiment was described for the case in which the front edge 19d is at a height that is lower than the lowest height hi of the rear floor panel 7 above the road surface, this position is not restricted in this manner, and it is also possible to use the depression formed in the bottom of the kick-up part 7b, and to set the height of the front edge 19d substantially the same as the height h1, or higher than the height h1.

Additionally, although the bend part 19b as described in the first embodiment is disposed at a position that is further to the rear of the rear axle 4 of the differential gear 6 by a prescribed distance of L, there is no restriction placed on this, and it is also possible, for example, to have the bend part 19b disposed at the same position as or even in front of the rear axle 4.

In the foregoing first embodiment, although the air intake opening and air exhaust opening are not specially formed, but are merely the space 30 between the front edge 19d of the rear undercover main body 19 and the rear floor panel 7 and the space 32 between the rear edge 19e of the rear undercover main body 19 and the bottom edge part 16a of the rear bumper member 16, respectively, there is no restriction to this arrangement, and it is alternately possible, for example, to provide dedicated openings in the rear bumper member 16 and the like to serve as the air intake opening and the air exhaust opening.

While in the first embodiment upward-extending left and right mud guard vertical walls 25 and 26 are provided at the side edges of the rear undercover main body 19, it is not necessary to provide the left and right mud guard vertical walls 25 and 26 Additionally, a single opening 33 is formed beneath the differential gear 6 at substantially the center of the rear undercover main body 19 in the width direction, the description of the first embodiment does not limit the number, material, and shape of the opening 33, and it is alternately possible, for example, to form a plurality of openings. It is additionally possible to eliminate the opening 33 entirely.

While in the first embodiment a plurality of flow-adjusting fins 37 and 38 are formed along the front-to-back direction on the bottom of the rear undercover main body 19, this embodiment should not be construed as imposing a restriction on the number and the material of the fins, and it is alternately possible, for example, to entirely eliminate the flow-adjusting fins 37 and 38.

Additionally, while the first embodiment was described for the example of application to a FR (Front engine, Rear wheel drive) vehicle 14, in which a differential gear 6 is indicated as a drive element, this shall not be construed as imposing a limitation in this regard, it being alternately possible, for example, to apply the present invention to a rigid axle used at the rear of a FF (Front engine, Front wheel drive) vehicle.

The second embodiment of the present invention is described below, with references being made to FIG. 8 through FIG. 15.

Figure 8:
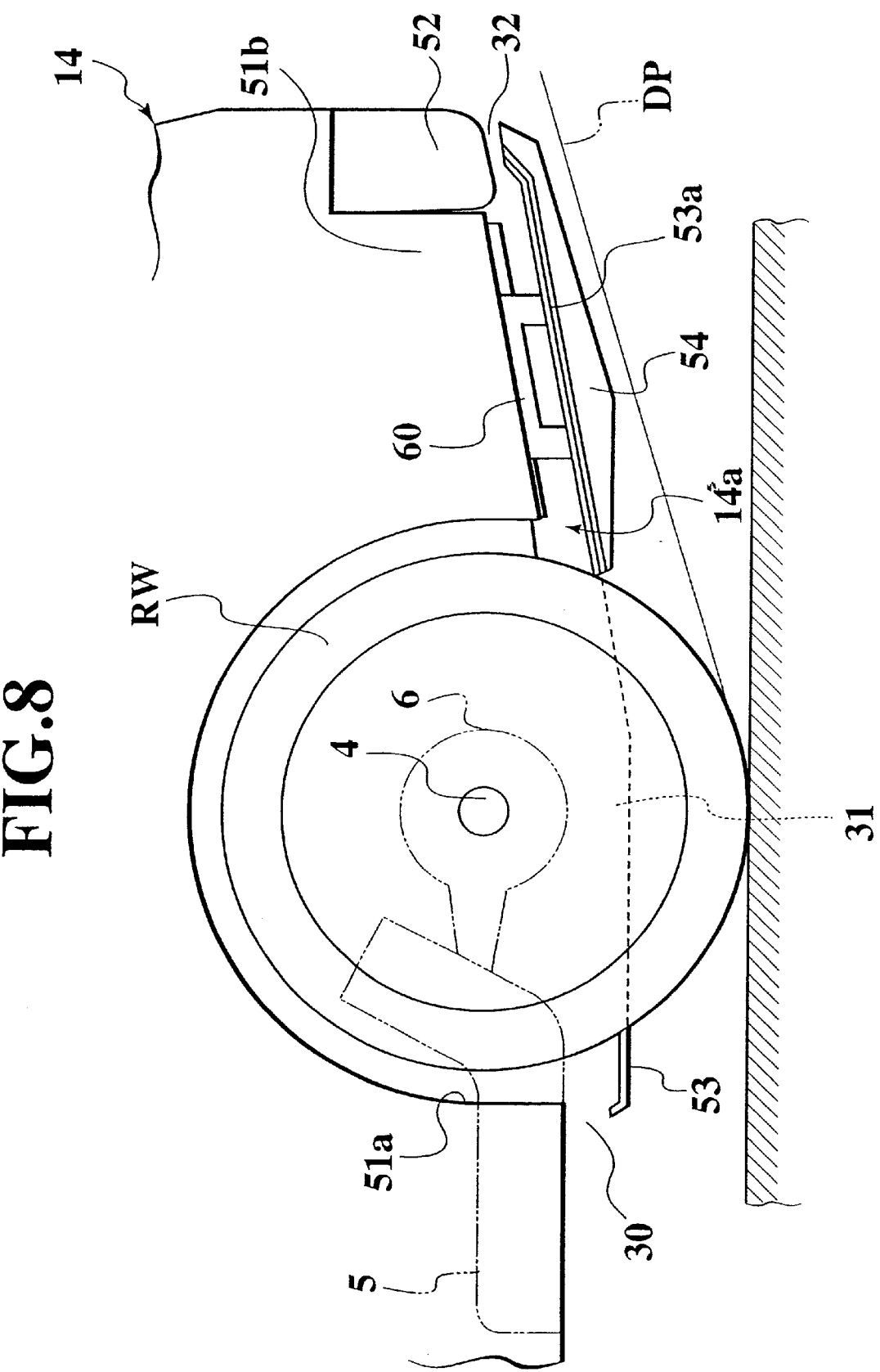
FIG. 8 is an overall view of a rear undercover main body used in the second embodiment of the present invention, as seen from the side of the vehicle.
Figure 9:
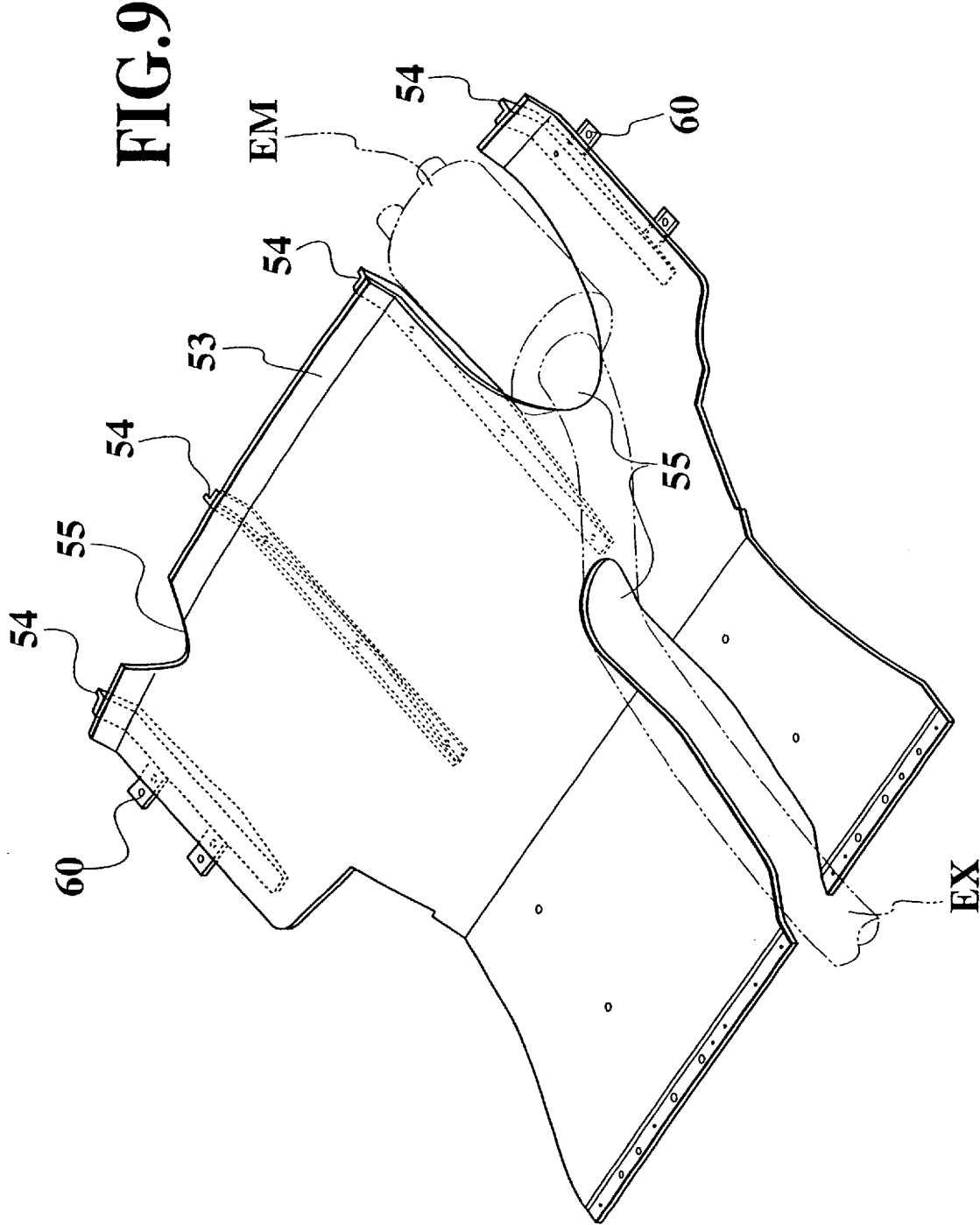
FIG. 9 is a perspective view of the rear undercover main body of FIG. 8.
Figure 10:
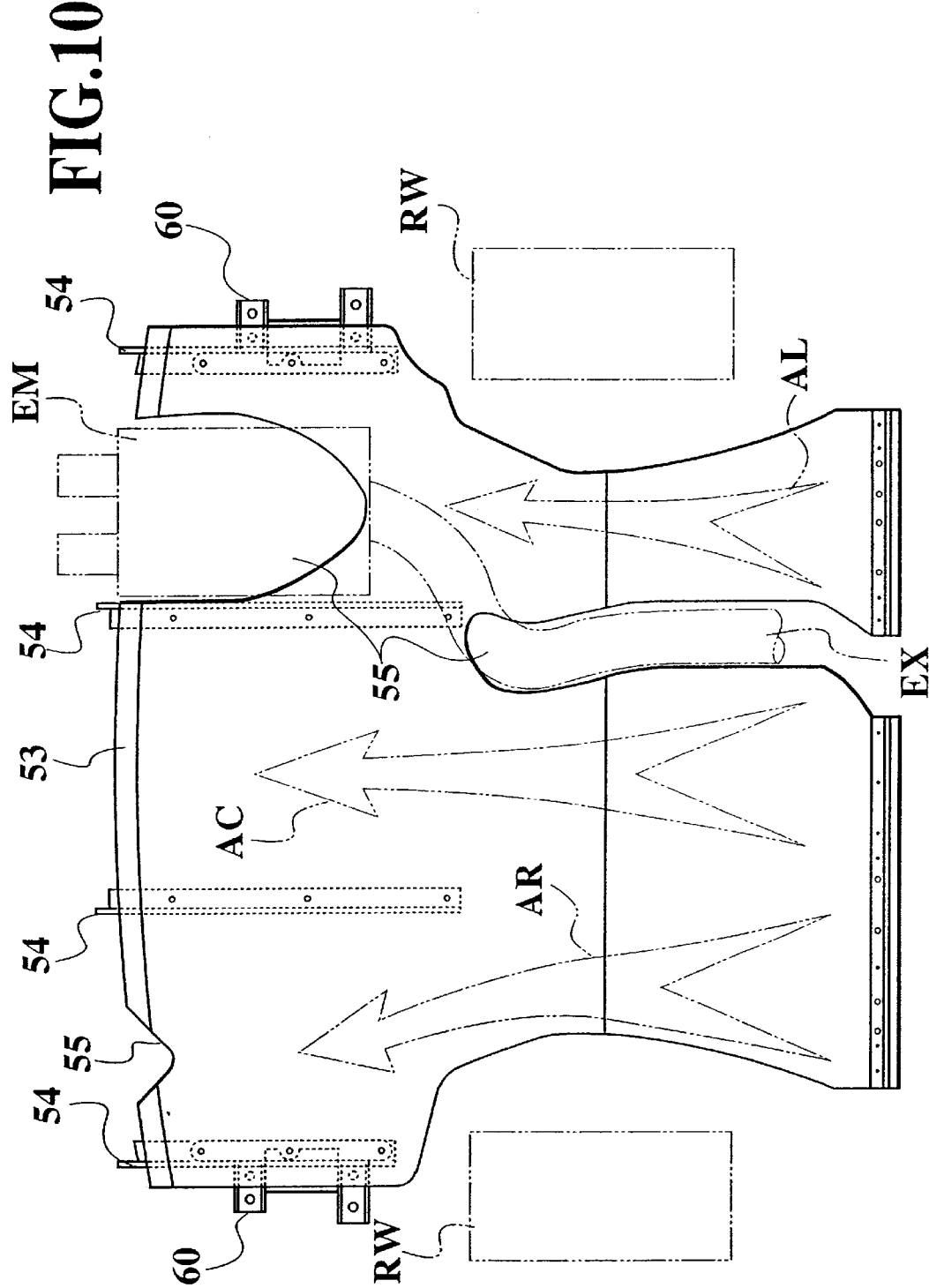
FIG. 10 is a top view of the rear undercover main body of FIG. 8.
Figure 11:
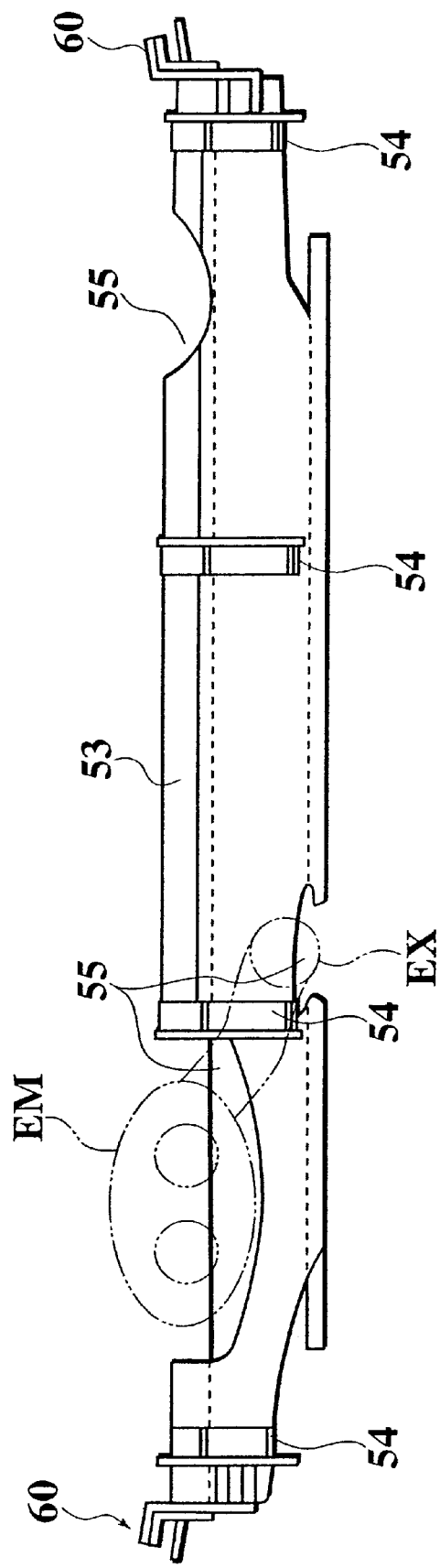
FIG. 11 is a rear view of the rear undercover main body of FIG. 8.

The structure of the second embodiment, as shown in FIG. 8, has a rear undercover main body 53 covering an area of the floorboard lower surface extending from the rear tire well 51a to the rear bumper 52. Four fins 54 are provided on the road surface side of the rear undercover main body 53, as shown in FIG. 9 to FIG. 11.

The rear undercover main body 53 is made of a resin fiber sheet into which is mixed a carbon resin or the like, and has a inclined planar part 53a that rises toward the rear.

On the rear undercover main body 53, an opening 55 is formed at a position corresponding to the position, for example, of a muffler at the underpart of the vehicle 14. A muffler or the like provided at the underpart of the vehicle 14 passes through this opening 55, so that it does not interfere with the rear undercover main body 53.

Figure 12:
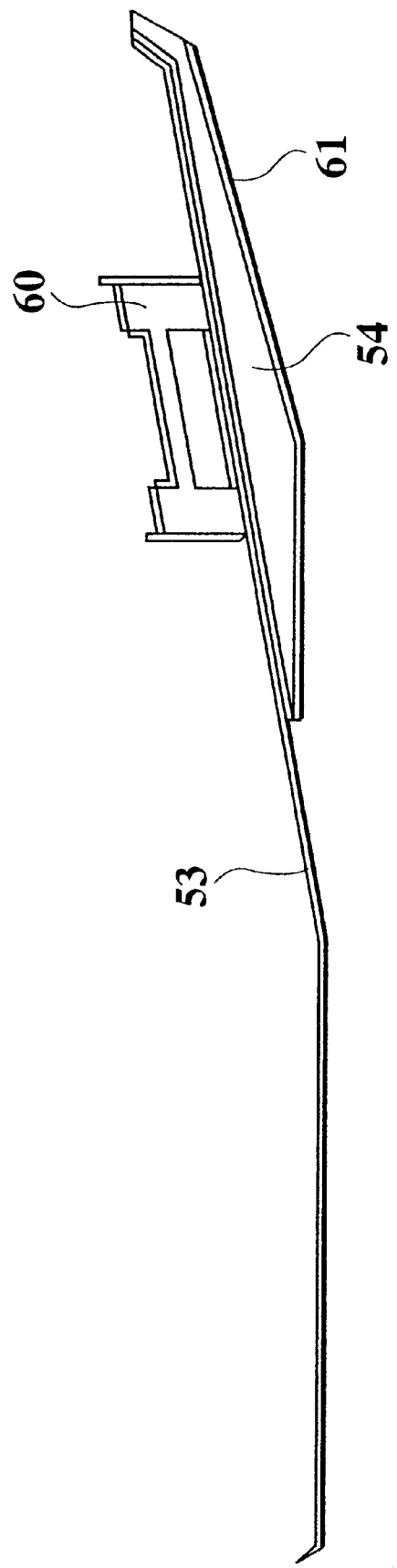
FIG. 12 is a side view of the rear undercover main body of FIG. 8.

The fins 54 are disposed on the rear undercover main body 53 at substantially equal intervals in the width direction. The front-to-back extending fins 54, similar to the inclined planar part 53a of the rear undercover main body 53 and as shown in FIG. 12 and FIG. 13, rise toward the rear.

The lower edge of the fins 54 is disposed at a height that is greater than the departure angle line DP of the rear wheel RW, and substantially along the departure angle line DP. Of these fins 54, the side fins are disposed so as to extend rearward to the inside at the center part of the rear wheels RW. The fins 54 at the center part are disposed so as to extend rearward towards the front opening 55 at a position corresponding to the exhaust pipe EX of the rear undercover main body 53. The rear opening 55 corresponds to the position of the muffler main part EM.

Figure 13:
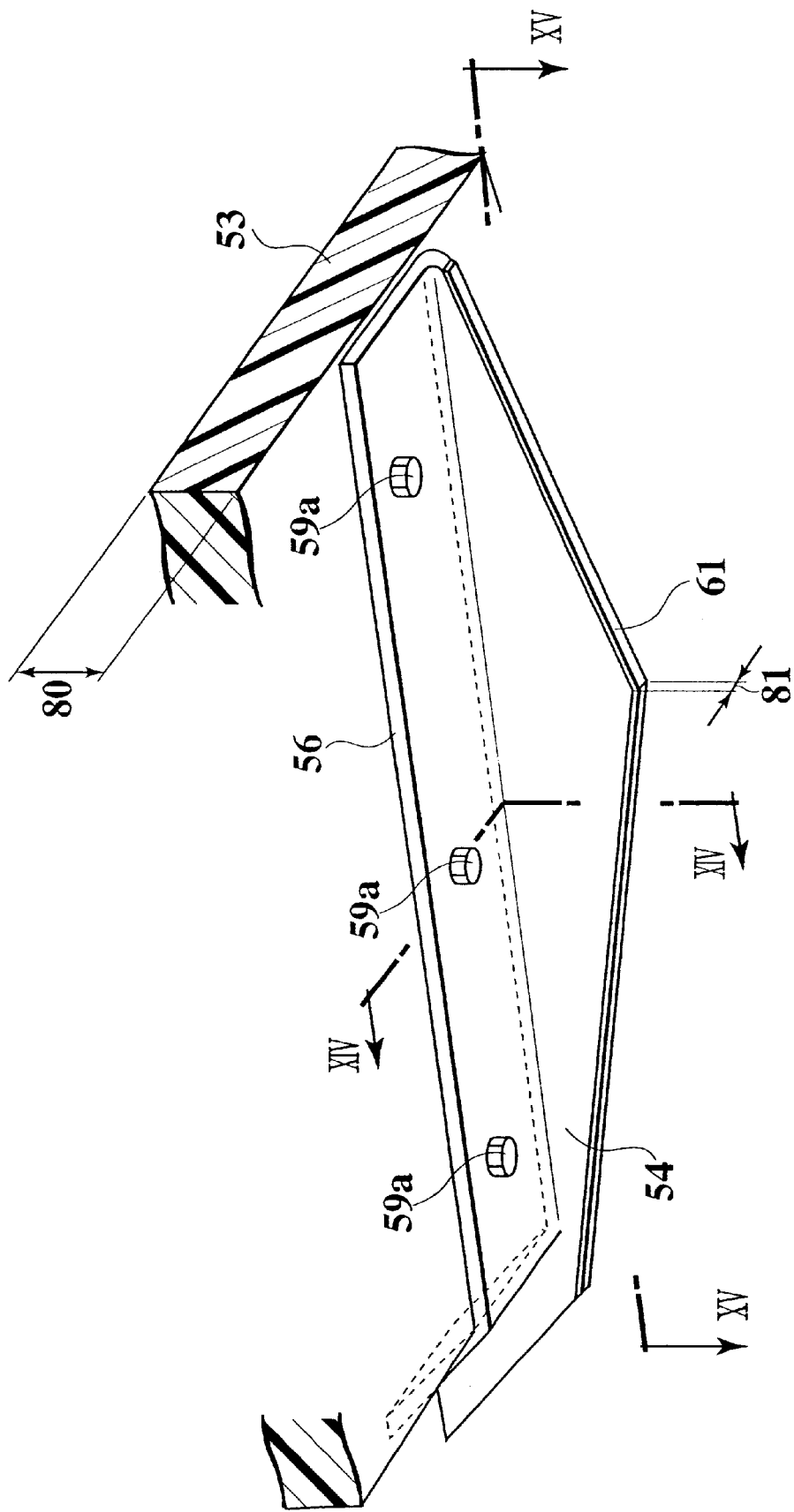
FIG. 13 is a perspective view of the fin shown in FIG. 8.

The XIV—XIV cross-section view in FIG. 14 of the fin 54 shown in FIG. 13 has a reverse L-shape, with a material thickness 81 that is thinner than the material thickness 80 of the rear undercover main body 53, this fin being made of a resin material that is lighter than the rear undercover main body 53.

The XV—XV cross-section view the fin 54, as shown in FIG. 15, has a uniform material thickness 81 along the front-to-back direction.

The mounting part 56 between the fin 54 and the rear undercover main body 53 is provided with a mounting hole 57. The mounting hole 57 and the mounting hole 58 provided in the rear undercover main body 53 are joined by a bolt 59a, inserted from the mounting part 56 of the fin 54, with an intervening well nut 59b and a washer 59c, so as to mount the fin 54 to the rear undercover main body 53.

The fins 54 mounted in near the sides of the rear undercover main body 53 in the width direction in particular are held fast to the rear undercover main body 53 by linking members 60 for mounting the rear undercover main body 53 to the body of the vehicle 14. The linking members 60 are fixed to the rear fender panels 51b.

A wear-preventing metal plate 61 is provided on the bottom part of each the fins 54. The metal plate 61 prevents wear of the fins 54 caused by contact with the road surface.

The action of the second embodiment of the present invention is described below.

By providing fins 54 on the rear undercover main body 53, the flow of air beneath the rear undercover main body 53 between the rear wheels RW, which tends to be disturbed by the front opening corresponding to the exhaust pipe EX, the rear wheels RW, and the cutout for the rear wheels in the rear undercover main body 53 is divided under the inclined planar part 53a of the rear undercover main body 53 into a right air flow AR, a center air flow AC, and a left air flow AL, so that it is difficult for air of any particular divided flow part to enter an adjacent air flow, the result being the achievement of enhanced air flow. Additionally, flow of air which escapes to the side of the vehicle is suppressed, thereby reducing the disturbance of air flow. By doing this, it is not only possible to achieve a desired down force, for example, but also possible to improve the riding stability and comfort of the vehicle.

By mounting the fins 54 to the rear undercover main body 53, the shock imparted to the rear undercover main body 53 is absorbed by deformation of the fins 54 if the underside of the floorboard makes contact with the road surface, thereby reducing damage to the rear undercover main body 53.

In particular, because the material thickness 81 of the fins 54 is smaller than the material thickness 80 of the rear undercover main body 53, the fins 54 tend to deform more than the rear undercover main body 53 when subjected to contact. For this reason, the deformed fins 54 absorb the shock, thereby enabling minimization of the shock imparted to the rear undercover main body 53.

Because the fins 54 are made of a material that is softer than the material of the rear undercover main body 53, when contact is made with the road surface, they absorb the resulting shock more than the rear undercover main body 53. Depending upon the resilience of the soft fins and the strength of the imparted shock, there are cases in which the deformed fins 54 will be restored to their original shape, thereby reducing the damage imparted to the fins 54 themselves, and reducing the cost incurred by unnecessary repairs.

Because the fins 54 are held fast to the rear undercover main body 53 by the bolts 59a, they can be attached and removed. Therefore, it is possible to selectively remove only a fin 54 that has been damaged by contact with the road surface, thereby reducing the cost incurred in the case in which the entire rear undercover main body 53 is replaced.

Because the fins 54 are removable, it is possible to replace the fins 54 with fins that having shapes, sizes and colors that are suited to the purpose of the vehicle and requirements of the user.

Because wear-preventing metal plates 61 are mounted under the fins 54, damage and wear of the fins 54 incurred by steps in the road surface and by contact with the road surface while travelling is reduced. Additionally, the wear-preventing metal plates create a pleasant appearance when viewed from behind the vehicle, thereby enhancing the outer appearance of the vehicle.

The third embodiment of the present invention is shown in FIG. 16 to FIG. 20. In the following description thereof, elements which correspond to elements in the second embodiment are assigned the same reference numerals.

Figure 16:
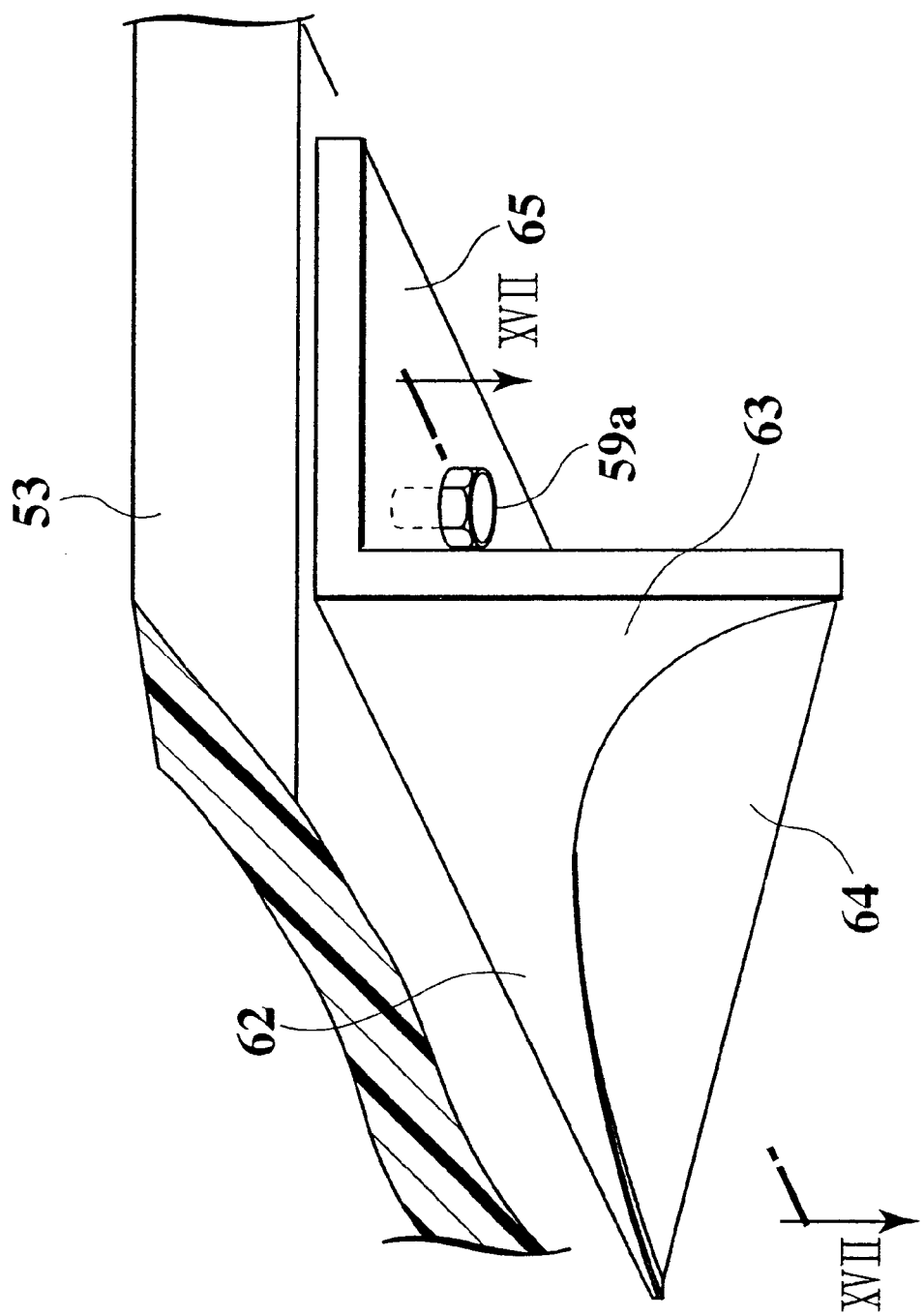
FIG. 16 is a perspective view of the fin used in the second embodiment of the present invention.

In the structure of the third embodiment, as shown in FIG. 16, fins 62 having the same shape and structure as in the second embodiment are provided on the rear undercover main body 53 so as to extend toward the front and the rear with respect to the longitudinal direction of the rear undercover main body 53.

Similar to the case of the second embodiment, the fins 62 are disposed on the rear undercover main body 53 with a substantially uniform interval in the width direction.

Figure 17:
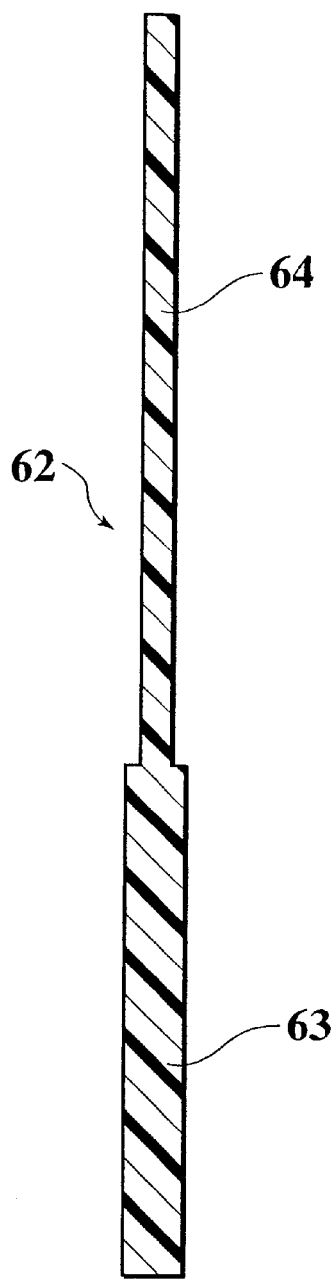
FIG. 17 is a cross-section view from a position indicated by the line XVII—XVII of FIG. 16.

The fins 62 are formed by a thick portion 63 near the rear edge and a thin portion 64 near the front edge, the cross-section view of FIG. 17, along the line XVII—XVII of FIG. 16 showing the protrusion shape having the thick portion 63 and the thin portion 64.

The fins 62, similar to the case of the second embodiment, are a reverse L-shape when viewed from the rear of the vehicle, and have a material thickness that is less than that of the rear undercover main body 53.

The mounting part 65 of the fins 62 with respect to the rear undercover main body 53 is provided with a mounting hole 57. This mounting hole 57 and the mounting hole 58 provided in the rear undercover main body 53 are joined by a bolt 59a, inserted from the mounting part 65 of the fin 62, with an intervening well nut 59b, so as to mount the fin 62 to the rear undercover main body 53.

The action of the third embodiment of the present invention is described below.

In the third embodiment of the present invention, as in the case of the second embodiment, because fins 62 are provided on a rear undercover main body 53, air that escapes from the side of the vehicle is suppressed and there is an accompanying reduction in the disturbance of the flow of air. In addition, it is possible to achieve a desired down force, and also to improve both the riding stability and comfort of the vehicle when travelling at a high speed.

Because the thin portion 64 of the fins 62 deforms more easily than the rear undercover main body 53 when subjected to contact with a step in the road surface or the like, deformation of the thin portion absorbs the shock which would be imparted to the rear undercover main body 53.

In the case in which it is not possible to provide sufficient shock absorption with the thin portion 64 alone, the thick portion 63 that is contiguous therewith can also absorb the shock.

Thus, by providing a stepped deformation of the fins 62 in response to the strength of the imparted shock, the shock imparted to the rear undercover main body 53 is absorbed. For this reason, it is possible to minimize the damage to the rear undercover main body 53.

Because thick portion 63 near the rear edge part of the fin 62 is integrally formed with the thin portion 64 thereof, so as to maintain the shape of the fin 62, it is possible to suppress flexing and vibration of the fin 62 caused by the wind during travelling.

Because the fins 62 are held fast to the rear undercover main body 53 by the bolts 59a, they can be attached and removed. Therefore, it is possible to selectively remove only a fin 62 that has been damaged by contact with the road surface, thereby reducing the cost incurred in the case in which the entire rear undercover main body 53 is replaced.

As the case of the second embodiment, it is possible to replace the fins 62 with fins that having shapes, sizes and colors that are suited to the purpose of the vehicle and requirements of the user.

Because of the thick portion 63 of the fin 62, the thin portion 64 cannot be seen from the rear of the vehicle, the visual impression given being that of the thick portion being integrally joined to the body of the vehicle. For this reason, the impression of weakness that would be given by the thin portion 64 is eliminated, thereby improving the outer appearance of the vehicle.

By decorating the rear end of the thick portion 63 of the fin 62, for example by making it the same color as the rear bumper 52, it is possible to impart a pleasant appearance accent to the vehicle.

It will be understood that the third embodiment of the present invention is not restricted to the case in which the cross-section of the fin 62 has a protrusion made up of a thick portion 63 and a thin portion 64.

Figure 18:
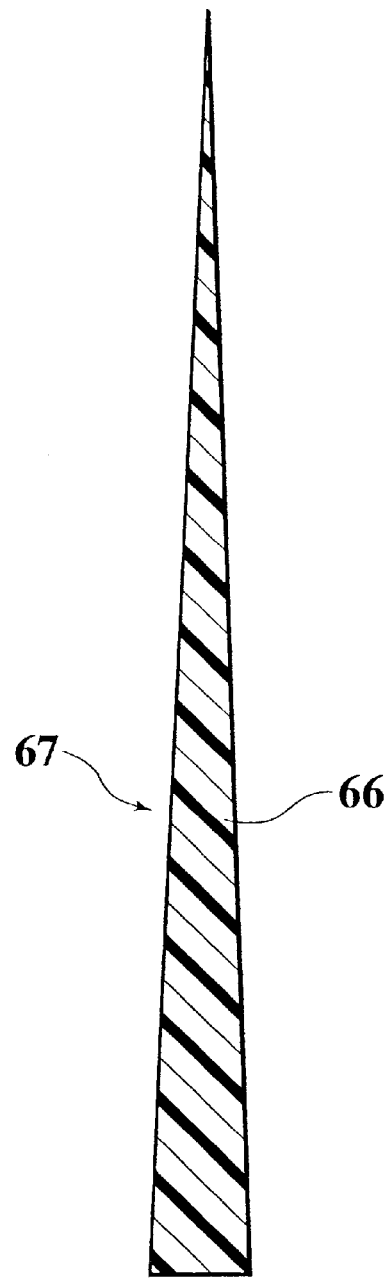
FIG. 18 is a cross-section view of the fin of the first variation.

As shown in FIG. 18, a first variation of the fin 62 in the third embodiment is possible, in which the variation fin 67 has a cross-section shape corresponding to that shown in FIG. 17 which is an isosceles triangle cross-sectional shape 66.

According to the first variation fin 67, in addition to the basic effects obtained by the third embodiment, there is a further enhanced guiding of air flow when the vehicle is travelling, compared to when using the fins 62, thereby reducing the disturbance to the flow of air, and improving the high-speed riding stability and comfort.

Figure 19:
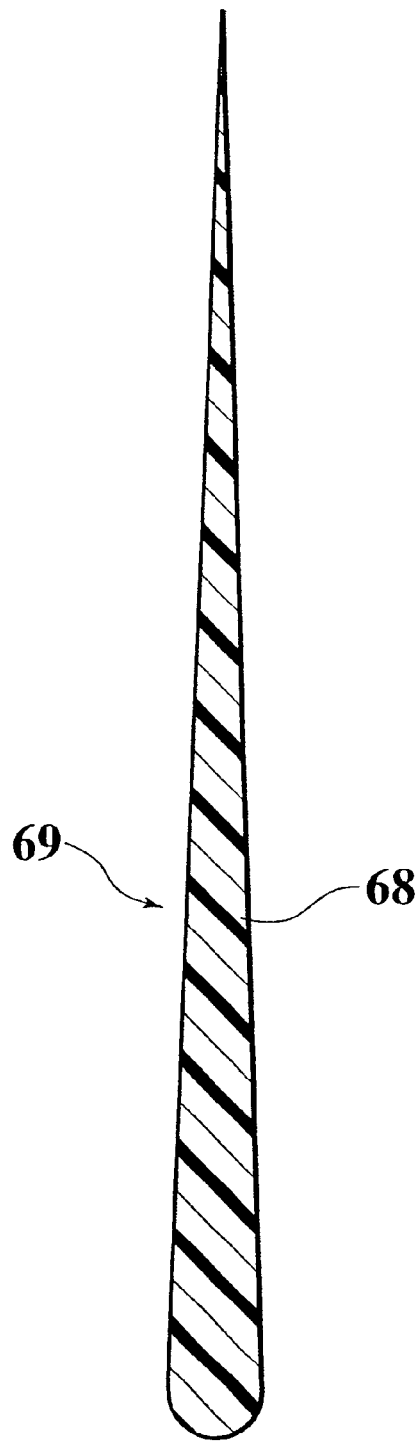
FIG. 19 is a cross-section view of the fin of the second variation.

As shown in FIG. 19, a second variation of the fin 62 of the third embodiment can be used, this being the fin 69, the cross-section shape 68 of which that corresponds to the cross-section view shown in FIG. 17 being in this case an isosceles triangle with a curved convex part.

According to the second variation fin 69, in addition to the basic effects obtained by the third embodiment, because the rear end part of the fin 69 is rounded, compared with the fin 62, there is less tendency for air flow to be disturbed at the rear of the vehicle, thereby providing improved riding stability and comfort.

Figure 20:
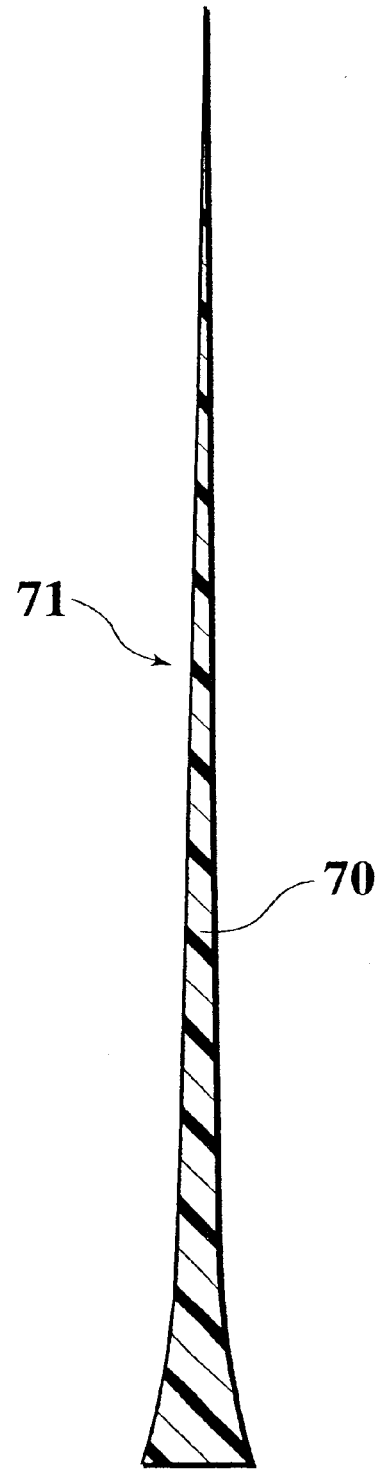
FIG. 20 is a cross-section view of the fine of the third variation.

As shown in FIG. 20, a third variation of the fin 62 of the third embodiment can be used, this being the fin 71, the cross-section shape 70 of which that corresponds to the cross-section view shown in FIG. 17 being in this case an isosceles triangle with a curved concave part.

According to the third variation fin 71, in addition to the basic effects obtained by the third embodiment, because the side walls are formed as gently changing curves, compared to the fin 62, it is possible to form the fin with a small amount of material, thereby enabling a reduction in the cost of the fin 71 itself.

The above describes the second and third embodiments of the present invention, and it will be understood that these embodiments do not place a restriction on the implementation of the present invention, a variety of changes thereof being possible, within the scope and spirit thereof.

For example, although in the second and third embodiments, while the bolts 59a and well nuts 59b are used to hold the fins 54 and 62 to the rear undercover main body 53, the scope of the present invention should be understood to include a structure in which an engaging finger is provided in one of the elements and an engaging hole is provided in the other, the fins being attached and removed by means of these engaging elements.

Additionally, while the second and third embodiments were described for the case in which the four fins 54 and 62 are provided on the rear undercover main body 53 at a uniform interval, this does not impose a restriction to the use of four fins 54 and 62.

Additionally, it will be understood that there is no restriction imposed with regard to the size, shape, and material of the fins 54 and 62, and the rear undercover main body 53 to those indicated in the exemplary second and third embodiments.

What is claimed is:

1. A rear underside structure of a vehicle, comprising:

a rear undercover main body with an inclined planar part rising toward a rear of the vehicle, the rear undercover main body disposed beneath a drive element disposed further to the rear than a fuel tank between a front and rear axle so as to cover a rear under part of the vehicle including the drive element;

an air flow path delineated by the rear undercover main body and the drive element, at least a rear part of which is delineated by the inclined planar part;

an air intake opening disposed forward of the drive element;

an air exhaust opening disposed to the rear of the inclined planar part, wherein air entering from the air intake opening passes through the air flow path, and is exhausted from the exhaust opening;

a removably attachable fin on a bottom surface of the inclined planar part; and wherein the fin is thinner than the rear undercover main body.

2. A rear underside structure of a vehicle, comprising:

a rear undercover main body with an inclined planar part rising toward a rear of the vehicle, the rear undercover main body disposed beneath a drive element disposed further to the rear than a fuel tank between a front and rear axle so as to cover a rear under part of the vehicle including the drive element;

an air flow path delineated by the rear undercover main body and the drive element, at least a rear part of which is delineated by the inclined planar part;

an air intake opening disposed forward of the drive element;

an air exhaust opening disposed to the rear of the inclined planar part, wherein air entering from the air intake opening passes through the air flow path, and is exhausted from the exhaust opening;

a removably attachable fin on a bottom surface of the inclined planar part; and wherein the fin is softer than the rear undercover main body.

3. A rear underside structure of a vehicle, comprising:

a rear undercover main body with an inclined planar part rising toward a rear of the vehicle, the rear undercover main body disposed beneath a drive element disposed further to the rear than a fuel tank between a front and rear axle so as to cover a rear under part of the vehicle including the drive element;

an air flow path delineated by the rear undercover main body and the drive element, at least a rear part of which is delineated by the inclined planar part;

an air intake opening disposed forward of the drive element;

an air exhaust opening disposed to the rear of the inclined planar part, wherein air entering from the air intake opening passes through the air flow path, and is exhausted from the exhaust opening;

a removably attachable fin on a bottom surface of the inclined planar part; and wherein the fin comprises a thick portion disposed near an edge at the rear of the vehicle and a thin portion disposed in front of the thick portion.

* * * * *